United States Patent [19]

Kimura

[11] 4,419,614

[45] Dec. 6, 1983

[54] APPARATUS FOR DRIVING OBJECTIVE LENS IN TRACKING DIRECTION

[75] Inventor: Kenji Kimura, Tachikawa, Japan

[73] Assignee: Olympus Optical Company Limited, Japan

[21] Appl. No.: 352,475

[22] Filed: Feb. 26, 1982

[30] Foreign Application Priority Data

Mar. 7, 1981 [JP] Japan ................... 56-33030

[51] Int. Cl.³ .............................................. G05B 1/06
[52] U.S. Cl. .................................. 318/653; 310/154; 350/247; 350/255
[58] Field of Search .................. 318/563; 310/154; 335/230; 355/247, 255

[56] References Cited

U.S. PATENT DOCUMENTS

| | | | |
|---|---|---|---|
| 2,882,459 | 4/1959 | Berglund | 335/230 |
| 4,376,903 | 3/1983 | Mishima | 310/154 |
| 4,386,823 | 6/1983 | Musha | 350/255 X |

*Primary Examiner*—B. Dobeck
*Attorney, Agent, or Firm*—Parkhurst & Oliff

[57] ABSTRACT

In an apparatus having an objective lens for projecting a light spot on a track of a disc-shaped record medium, the objective lens is driven in a tracking direction perpendicular to an optical axis of the objective lens and to a track tangential direction in accordance with a tracking error signal representing a deviation of the light spot from the track by means of a tracking control mechanism including first and second permanent magnets, first and second magnetic members connecting the same poles of the permanent magnets, a third magnetic member holding the objective lens and arranged movably in the tracking direction within a space surrounded by the first and second permanent magnets and first and second magnetic members, and first and second coils wound around the first and second magnetic members at middle portions thereof. A resonant vibration is dumped by providing a motional feedback loop in which a displacement of the third magnetic member is detected by a pair of magnetoelectro transducing elements secured to the first and second permanent magnets, respectively at middle portions thereof so as to detect change of magnetic fluxes leaked out of the third magnet member in opposite directions along the tracking direction.

8 Claims, 7 Drawing Figures

APPARATUS FOR DRIVING OBJECTIVE LENS IN TRACKING DIRECTION

BACKGROUND OF THE INVENTION

The present invention relates to an apparatus for driving an objective lens in a direction perpendicular to an optical axis of the objective lens.

Such an objective lens driving apparatus may be advantageously applied to an optical scanning apparatus in which a scanning light spot is projected by an objective lens onto information tracks recorded spirally or concentrically on a disc-shaped record medium to write in or read out an information signal along the tracks. In such an apparatus the light spot should follow the track having very narrow width and pitch in a very precise manner, and for this purpose the apparatus is provided with focussing control mechanism and tracking control mechanism. In the focussing control mechanism, the objective lens is driven in a focussing direction parallel with its optical axis so as to make a diameter of the light spot projected on the record medium as small as possible and in the tracking control mechanism, the objective lens is moved in a tracking direction perpendicular to the optical axis and to a track tangential direction.

In U.S. patent application Ser. No. 139,756 assigned to the same assignee as the present application, there has been proposed an objective lens driving apparatus which comprises first and second magnet members arranged symmetrically with respect to a plane which includes an optical axis of an objective lens and is at right angles with respect to a tracking direction perpendicular to the optical axis and to a track tangential direction, first and second magnetic members arranged across the same poles of said first and second magnet members, a third magnetic member arranged within a space surrounded by said first and second magnet members and first and second magnetic members movably in the tracking direction together with the objective lens, and first and second coils wound around said first and second magnetic members, respectively substantially at middle portions thereof, whereby the third magnetic member and objective lens are moved in said tracking direction by supplying a tracking control signal to said first and second coils. In such an objective lens driving apparatus, the third magnetic member and objective lens are supported movably in the tracking direction by means of a resilient supporting member such as a pair of leaf springs extending in the optical axis direction. Then such a supporting member has a resonance point due to a mechanical vibration. At the resonance point, the tracking control signal and the displacement of the objective lens in the tracking direction might be inverted in phase and thus, an accurate tracking control could not be effected. In order to suppress such a resonant vibration, in the above mentioned application magnetic fluids are applied in spaces between the third magnetic member and the coils. In general, a viscosity of the magnetic fluid is largely dependent upon temperature, so that the dumping characteristic is also varied in accordance with temperature change. Moreover, the dumping property is greatly influenced by an amount of the applied magnetic fluids and therefore, it would be rather difficult to manufacture the objective lens driving apparatus having a uniform dumping property on a mass production scale.

SUMMARY OF THE INVENTION

The present invention has for its object to provide an improved apparatus for driving an objective lens in a tracking direction which apparatus can avoid the drawback of the aforementioned known apparatus and can drive the objective lens in an accurate and precise manner, while the undesired resonant vibration can be fully suppressed by a stable dumping property.

According to the invention, in an apparatus for driving an objective lens in a tracking direction perpendicular to an optical axis of the objective lens and to a track direction comprising first and second magnet members arranged symmetrically with respect to a plane which includes the optical axis of objective lens and is at right angles to said tracking direction, first and second magnetic members arranged across the same poles of said first and second magnet members, a third magnetic member arranged within a space surrounded by said first and second magnet members and first and second magnetic members movably in the tracking direction together with the objective lens, and first and second coils wound around said first and second magnetic members, respectively substantially at middle portions thereof, said third magnetic member and objective lens being moved in said tracking direction by supplying a tracking control signal to said first and second coils, the improvement comprises magneto-electro transducing means for detecting a magnetic flux leaked out of said third magnetic member to produce an electric signal representing a displacement of said third magnetic member and objective lens in the tracking direction and means for feeding back said electric signal to said tracking control signal to suppress a resonant vibration of the third magnetic member and objective lens.

DESCRIPTION OF THE PREFERRED EMBODIMENTS

Figure 1A:
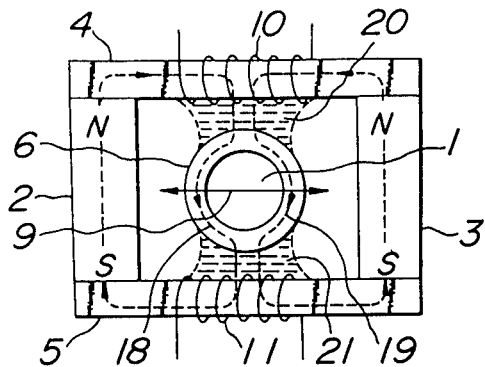
FIGS. 1A and 1B are plan and side views, respectively showing a known objective lens driving apparatus.
Figure 1B:
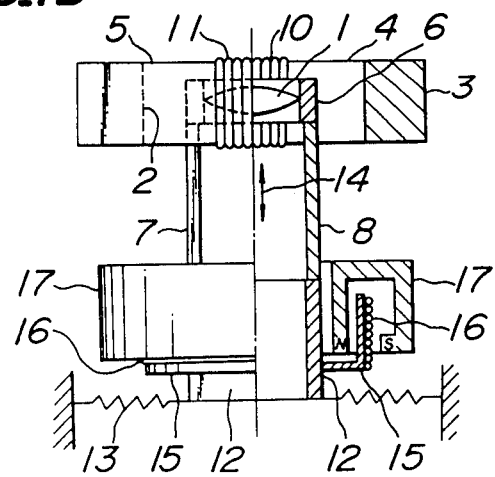

FIGS. 1A and 1B show the known objective lens driving apparatus disclosed in the aforementioned United States Patent Application. An objective lens 1 focusses a laser light beam onto a disc-shaped record medium to trace a track consisting of a pit array. The light beam reflected by the record medium is collected by the objective lens 1 and is made incident upon a light detector to produce a reproduced information signal.

The driving apparatus comprises first and second magnet members consisting of rod-shaped permanent magnets 2 and 3 polarized in a direction shown in FIG. 1A. The smae poles of these permanent magnets 2 and 3 are coupled with each other by means of first and second magnetic members 4 and 5 serving as yokes. The objective lens 1 is supported by a third magnetic member 6 which also serves as a lens holder, and the objective lens 1 and third magnetic member 6 are arranged in a space surrounded by the first and second permanent magnets 2 and 3 and first and second magnetic members 4 and 5 and are supported by first and second leaf springs 7 and 8 movably in a tracking direction 9 which is perpendicular to the optical axis of objective lens 1 and to a track direction. Around the first and second yokes 4 and 5 are wound first and second coils 10 and 11, respectively at substantially middle portions of the yokes. The leaf springs 7 and 8 are connected to a ring-shaped frame 12 which is then coupled with a fixed member via a dumping member 13, so that the frame 12 and thus the objective lens 1 is movable in a focussing direction 14 parallel to the optical axis. The frame 12 is provided integrally therewith a coil bobbin 15 around which a moving coil 16 is wound. A permanent magnet 17 is so arranged that the moving coil 16 intersects a magnetic flux produced by the permanent magnet 17.

As illustrated in FIG. 1A, the first and second permanent magnets 2 and 3 produce first and second magnetic fluxes 18 and 19 passing through the first magnetic member 4, the third magnetic member 6 and the second magnetic member 5. When no current is supplied to the first and second coils 10 and 11 in a stationary state, the third magnetic member 6 and thus the objective lens 1 are situated at a center point, i.e. a neutral point between the first and second permanent magnets 2 and 3. Contrary to this, when the tracking control signal is supplied to the first and second coils 10 and 11 in such a manner that the first magnetic flux 18 due to the first permanent magnet 2 is increased by the magnetic flux produced by the coils 10 and 11, but the second magnetic flux 19 due to the second permanent magnet 3 is decreased by a magnetic flux produced by the coils 10 and 11, the third magnetic member 6 and objective lens 1 are moved toward the first permanent magnet 2, and vice versa. In this manner, the objective lens 1 can be driven in the tracking direction 9. In this case, the driving direction is determined by polarity of tracking control signal supplied to the coils 10 and 11 and an amount of the displacement is related to an amplitude of the tracking control signal. Therefore, when the coils 10 and 11 are energized with the tracking control signal having the polarity and amplitude corresponding to a direction and an amount of an tracking error between the light spot and the track, the objective lens 1 can be driven in the tracking direction so as to remove the tracking error and the light spot can be projected upon the track in a precise manner.

In the focussing control system, a focussing control signal is supplied to the moving coil 16 and the objective lens 1 is moved in the focussing direction 14 so as to make the light spot projected onto the record medium as small as possible.

In the above explained objective lens driving apparatus, the objective lens 1 is supported movably in the tracking direction 9 by means of the leaf springs 7 and 8 having a mechanical resilient property and thus, a resonant vibration is generated at a given resonance frequency which is determined by a mass of the third magnetic member 6 and objective lens 1. At the resonance frequency, the relative phase between the tracking control signal supplied to the coils 10 and 11 and the displacement of the objective lens 1 in the focussing direction 9 is inverted and therefore the accurate tracking control could not be effected. In order to avoid such a resonant vibration, in the known apparatus shown in FIGS. 1A and 1B magnetic fluids 20 and 21 are applied in spaces formed between the first and second magnetic members 4 and 5 and the third magnetic member 6 and the resonant vibration is suppressed by a dumping property due to a viscosity of the magnetic fluids 20 and 21. However, in such an apparatus since the viscosity of the magnetic fluids 20, 21 depend upon temperature, the dumping property is greatly changed in accordance with the temperature variation. Further, the dumping property is also varied in accordance with an amount of the magnetic fluids 20, 21 filled in said spaces and it is rather difficult to control the amount of the magnetic fluids during the manufacturing process. Therefore, the objective lens driving apparatuses having the uniform dumping property could be manufactured in a mass scale only with difficulty.

The present invention is to provide an improved objective lens driving apparatus in which the desired dumping property can be attained by means of a motional feedback system.

Figure 2:
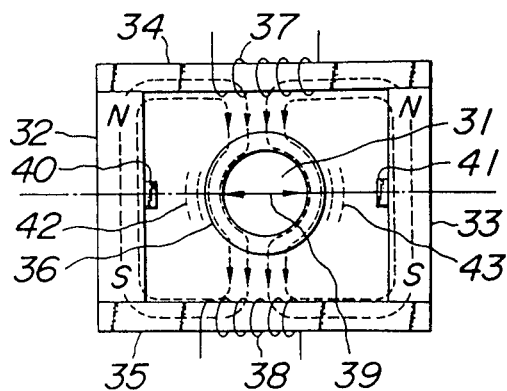
FIG. 2 is a plan view illustrating an embodiment of the objective lens driving apparatus according to the invention.

FIG. 2 is a plan view showing an embodiment of the objective lens driving apparatus according to the invention. On both sides of a plane including an optical axis of an objective lens 31 are arranged first and second permanent magnets 32 and 33 and the same poles of these magnets are coupled by first and second magnetic members 34 and 35. The objective lens 31 is held by a third magnetic member 36 which is supported movably in a tracking direction 39 by means of a resilient supporting mechanism not shown. Around the first and second magnetic members 34 and 35 are wound first and second coils 37 and 38, respectively at substantially middle portions of these magnetic members 34 and 35. The construction so far explained is same as that of the known apparatus shown in FIGS. 1A and 1B. In the present embodiment first and second magneto-electro transducing elements 40 and 41 are arranged at neutral points of the first and second permanent magnets 32 and 33 so as to detect magnetic fluxes 42 and 43 leaked out of the third magnetic member 36 in opposite directions. The magneto-electro transducing elements 40 and 41 may be Hall element, magnetic resistance element, magnet diode, etc. which can detect a variation of strength of magnetic field to produce an electric signal representing the variation of the magnetic field. Since the elements 40 and 41 are provided at the neutral points, i.e. the middle points of the permanent magnets 32 and 33, the elements do not respond to any variation of the magnetic fluxes due to the permanet magnets 32 and 33. However, when the third magnetic member 36 is moved in the tracking direction 39 the strengths of the magnetic fields at the elements 40 and 41 due to the leakage fluxes 42 and 43 are changed and thus, impedances, i.e. effective resistances of the elements 40 and 41 are changed accordingly. In this manner, the magneto-electro elements 40 and 41 can produce the electric signals which represent a position of the third magnetic member 36 along the tracking direction 39. It should be noted that the displacement of the third magnetic member 36 may be detected by a single magneto-electro transducing element which is provided at the middle portion of either the first or second permanent magnet 32 or 33. However, in general, an output characteristic of the magneto-electro transducing element is not linear with respect to the strength of magnetic field. In the embodiment illustrated in FIG. 2, a pair of magneto-electro elements 40 and 41 are arranged on both sides of the third magnetic member 36 viewed in the tracking direction 39 and the linearity of output characteristic can be improved by obtaining a difference between the output electric signals from these elements 40 and 41. Moreover, since the impendance changes of the magneto-electro transducing elements 40 and 41 become complementary to each other, the detection sensitivity can be also made high by producing the differential output.

Figure 3:
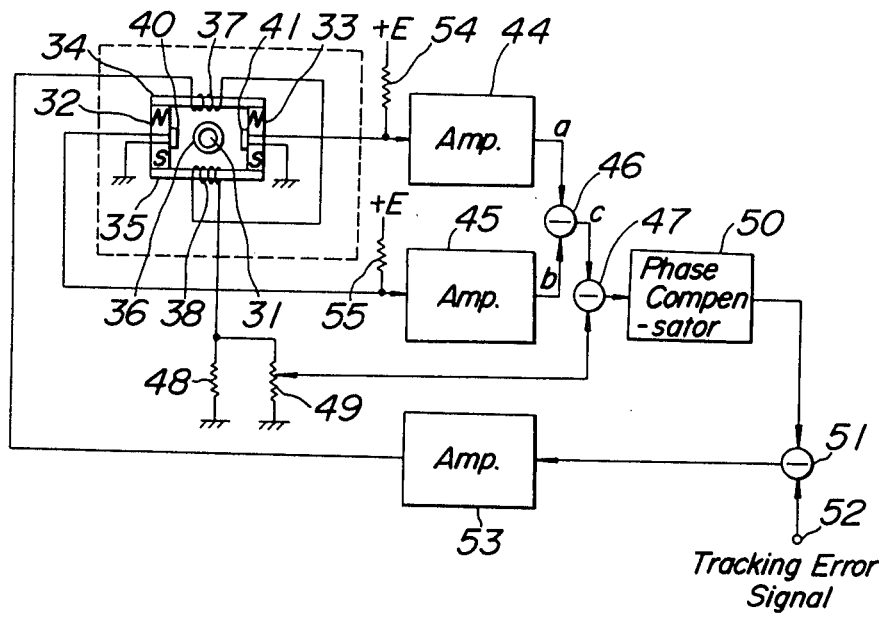
FIG. 3 is a block diagram depicting a circuit construction of the objective lens driving apparatus according to the invention.

FIG. 3 is a block diagram showing an embodiment of a circuit construction of the objective lens driving apparatus according to the invention. The output signals from the first and second magneto-electro transducing elements 40 and 41 are supplied to first and second amplifiers 44 and 45 and are amplified therein. The amplified signals are supplied to a subtractor 46 to derive a differential output signal which represents the position, i.e. the displacement of the third magnetic member 36.

Figure 4A:
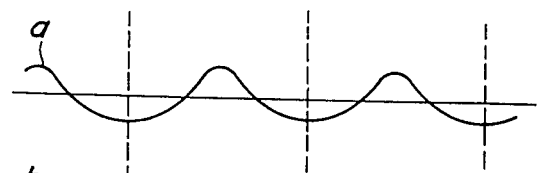
FIGS. 4A, 4B and 4C are graphs showing signal waveforms for explaining an operation of the apparatus illustrated in FIG. 3.
Figure 4B:
Figure 4C:
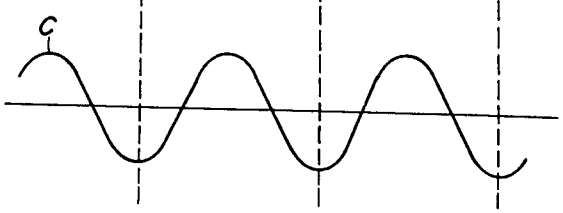

In FIGS. 4A and 4B are shown the output electric signals a and b supplied from the first and second magneto-electro transducing elements 40 and 41 and amplified by the amplifiers 44 and 45. These signals a and b are distored due to the non-linear output characteristic of the elements and are shifted in phase by 180°. FIG. 4C illustrates the differential output signal c supplied from the subtractor 46. The signal c has a sinusoidal waveform and has an amplitude larger than the signals a and b.

The differential output signal c has a polarity denoting a direction of the displacement of the third magnetic member 36 and has an amplitude representing an amount of the displacement. As shown in FIG. 3, the differential output signal c is supplied to one input of a second subtractor 47. The coils 37 and 38 are connected in series and one terminal of the series circuit is connected to the earth through a resistor 48. In parallel with the resistor 48 is connected a potentiometer 49 having a slidable tap connected to the other input of the second subtractor 47. As explained above, the magneto-electro transducing elements 40 and 41 are provided at the middle points of the permanent magnets 32 and 33, respectively. However, in fact the magnetic fields due to the permanent magnets and the coils are not completely neutralized at the middle points and the elements are subjected to slight changes of magnetic fluxes leaked out of the permanent magnets 32, 33 and magnetic members 34, 35. This magnetic flux change is proportional to the tracking control signal supplied to the coils 37, 38. The tracking control signal flows also through the resistor 48 to generate a voltage thereacross and an adjusted fraction of this voltage is derived by the potentiometer 49. The voltage thus derived is applied to the subtractor 47 and is subtracted from the differential output signal c. In this manner, the erroneous component in the differential output signal due to the spurious magnetic flux leaked out of parts other the third magnetic member 36 can be removed and the electric signal representing exclusively the displacement of the third magnetic member 36 can be obtained.

The electric signal thus obtained is supplied to a phase compensator 50 which adjusts the signal in such a manner that the dumping operation is made effective only for a frequency range near the resonant frequency. The signal thus compensated is further supplied to one input of a third subtractor 51 to the other input of which is supplied a tracking error signal from a terminal 52. The tracking error signal has a polarity denoting a direction of the deviation and an amplitude representing an amount of the deviation and can be derived in accordance with any known focus detection method. Since the manner of deriving the tracking error signal is not essential for the present invention, further explanation thereof is omitted.

The output signal from the third subtractor 51 is supplied to a current amplifier 53 to produce the tracking control signal having the desired frequency and phase characteristics in which the dumping property for the resonant vibration has been taken into account. The tracking control signal thus obtained is supplied to the first and second coils 37 and 38 and the objective lens 31 can be moved in the tracking direction in a very precise and accurate manner, while the undesired resonant vibration can be fully suppressed. In FIG. 3, reference numerals 54 and 55 denote resistors connected to the first and second magneto-electro transducing elements 40 and 41, respectively. At junctions of the elements 40, 41 and the resistors 54, 55 are produced voltages corresponding to the impendances of the elements.

The objective lens driving apparatus shown in FIG. 2 may be combined with the focussing control mechanism illustrated in FIGS. 1A and 1B. In this case the magneto-electro transducing elements 40, 41 might be subjected to a magnetic flux leaked out of the permanent magnet 17 of the focussing and tracking mechanisms and the strength of this leakage flux is varied in accordance with the displacement of the objective lens in its optical axis direction so that disturbance components are introduced in the electric signals from the first and second elements 40 and 41. However, since these disturbance components have the same phase in both signals, they are cancelled out in the differential output signal c supplied from the first subtractor 46. Therefore, in the embodiment shown in FIGS. 2 and 3, the dumping property is hardly affected by the displacement of the objective lens in the focussing direction.

As explained above in detail, in the objective lens driving apparatus according to the invention the resonant vibration can be effectively suppressed by providing the motional feedback loop. Moreover, the optimum dumping property can be precisely and simply attained by suitably determining loop gain and loop polarity. Further, the whole construction of the apparatus is relatively simple and can be realized in an easy manner.

It should be noted that the present invention is not limited to the embodiment explained above, but may be modified in various manners within the scope of the invention. In the above embodiment a pair of magneto-electro transducing elements are arranged on opposite sides of the objective lens, but one or more than two magneto-electro transducing elements may be provided. Further, in the embodiment mentioned above the magnet members are formed by the permanent magnets, but may be composed of electromagnets. In the above embodiment the objective lens is held by the third magnetic member which also serves as the lens holder, but the objective lens may be supported by a separate lens holder made of non-magnetic material and the third magnetic member may be secured to the lens holder.

What is claimed is:

1. In an apparatus for driving an objective lens in a tracking direction perpendicular to an optical axis of the objective lens and to a track direction comprising first and second magnet members arranged symmetrically with respect to a plane which includes the optical axis of objective lens and is at right angles to said tracking direction, first and second magnetic members arranged across the same poles of said first and second magnet members, a third magnetic member arranged within a space surrounded by said first and second magnet members and first and second magnetic members movably in the tracking direction together with the objective lens, and first and second coils wound around said first and second magnetic members, respectively substantially at middle portions thereof, said third magnetic member and objective lens being moved in said tracking direction by supplying a tracking control signal to said first and second coils, the improvement comprising magneto-electro transducing means for detecting a magnetic flux leaked out of said third magnetic member to produce an electric signal representing a displacement of the third magnetic member and objective lens in the tracking direction; and means for feeding back said electric signal to said tracking control signal to suppress a resonant vibration of the third magnetic member and objective lens.

2. An apparatus according to claim 1, wherein said magneto-electro transducing means comprises first and second magneto-electro transducing elements secured to said first and second magnet members, respectively substantially at middle portions thereof.

3. An apparatus according to claim 2, further comprising a first subtractor for producing a difference signal between the electric signals supplied from said first and second magneto-electro transducing elements.

4. An apparatus according to claim 3, wherein said feeding back means comprises a phase compensator for adjusting phase of said difference signal in such a manner that the resonant vibration is exclusively dumped.

5. An apparatus according to claim 1, wherein said objective lens and third magnetic member are supported movably in a focussing direction parallel to the optical axis of objective lens and are moved in the focussing direction by means of a focussing control mechanism.

6. An apparatus according to claim 5, wherein said focussing control mechanism comprises a moving coil and a permanent magnet producing a magnetic flux passing through the moving coil, and the apparatus further comprises compensating means for subtracting from said electric signal a disturbance component due to a spurious magnetic flux leaked out of said permanent magnet of the focussing control mechanism.

7. An apparatus according to claim 6, wherein said compensating means comprises a resistor connected in series with the first and second coils, a potentiometer connected across the resistor, and a subtractor for subtracting an output voltage of the potentiometer from the electric signal supplied from the magneto-electro transducing means.

8. An apparatus according to claim 1, wherein said feeding back means comprises a subtractor for subtracting the electric signal from a tracking error signal to produce the tracking control signal.

* * * * *